Figure 1:
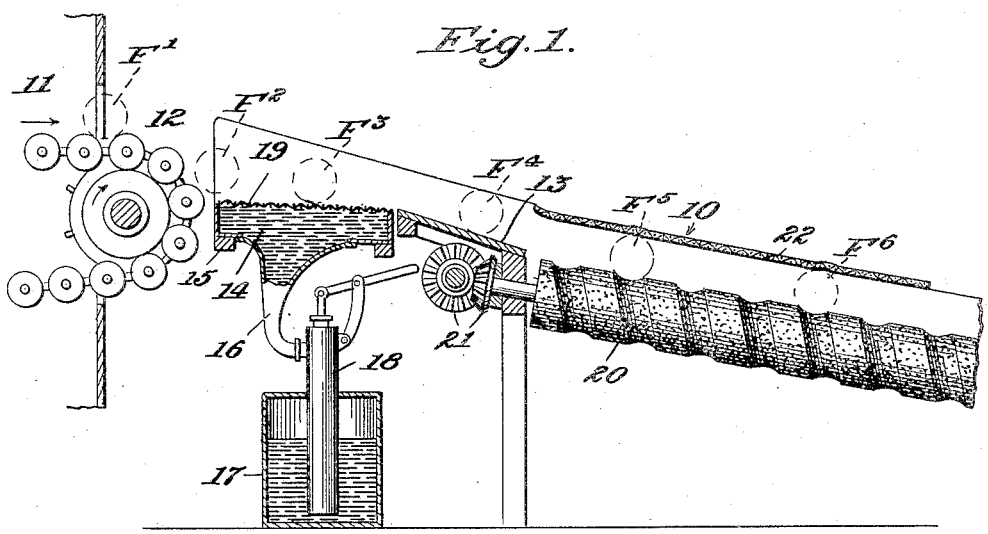

July 17, 1928. 1,677,229

A. W. CONKLIN

FRUIT TREATING APPARATUS

Original Filed March 6, 1922

Inventor:
A. W. Conklin
by Steward & McKay
his Att'ys.

Patented July 17, 1928.

1,677,229

UNITED STATES PATENT OFFICE.

ARCHIE W. CONKLIN, OF WINTER HAVEN, FLORIDA, ASSIGNOR, BY MESNE ASSIGNMENTS, TO BROGDEX COMPANY, OF WINTER HAVEN, FLORIDA, A CORPORATION OF FLORIDA.

FRUIT-TREATING APPARATUS.

Application filed March 6, 1922, Serial No. 541,269. Renewed March 29, 1926.

This invention relates to fruit treating apparatus; and it relates more particularly to apparatus for preparing for market fresh fruit that is naturally of such perishable character as to require special treatment in order to insure its reaching the consumer in sound and readily salable condition.

The general object of the invention is the provision of mechanically operating means for applying a fluid or semi-fluid coating material to the fruit and forming therefrom a thin continuous and polished coating covering the fruit. Among more particular objects the invention contemplates the provision of simple mechanically operating means for initially applying the coating material to the fruit in the required amounts, and for controllably regulating the supply of the material to the applying means.

The apparatus of the invention is useful in the treatment of any fruit upon which it is desirable to apply a coating in the manner stated, and it is especially useful for the treatment of oranges, grapefruit, and other citrus fruits which, as is well known, must be handled, packed and shipped with great care if they are to reach the consumer in good condition.

It has been discovered that by properly applying to citrus fruit a mixture of a sealing and waterproofing material, such as paraffin, with a liquid vehicle, such as gasolene, the fruit may be provided with a very thin but continuous coating that protects it against rotting, prevents it from withering, and in general maintains its original appearance, soundness, freshness and flavor. The apparatus of the present invention enables this treatment to be carried out in a simple, economical and effective manner. Accordingly, in explaining the principles of the invention, reference will be made, for the sake of a concrete illustrative example, to novel apparatus particularly useful in treating citrus fruit on a large scale.

In one of its broad aspects, the novel apparatus comprises material-applying means functioning by mechanical cooperation with the pieces of fruit in their feeding movement in the apparatus, together with means for controllably regulating the quantity of the coating material supplied to the applying means, and means of some description for brushing or otherwise rubbing the surface of the fruit to uniformly distribute the applied material in a relatively thin and smooth coating or film over its surface.

The underlying principles of the invention can be readily understood from the description hereinafter given of an illustrative embodiment in which said principles are incorporated in a form that not only works satisfactorily but that has the advantage of utilizing standard fruit handling machinery with only relatively slight alterations and additions to confer upon it the novel capabilities hereinbefore referred to. It is to be understood, however, that the embodiment hereinafter described is merely illustrative of a typical construction within the broad scope of the invention and illustrating its principles, and that the invention includes various other specific constructions capable of functioning in accordance with said principles.

Figure 2:
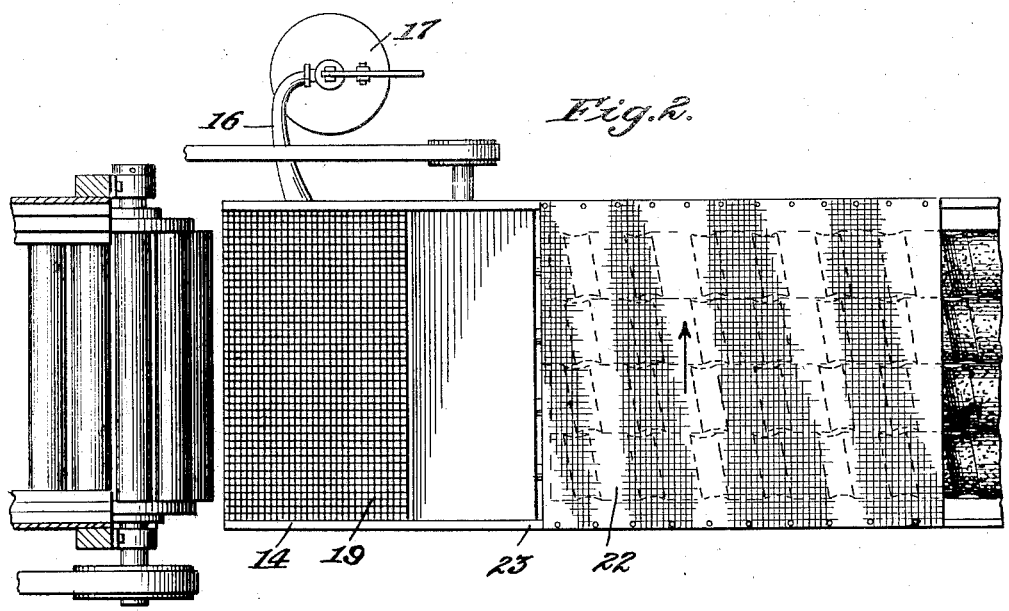

Such a typical embodiment is illustrated in the accompanying drawings, wherein:

Fig. 1 is a side elevation, partly broken away and in section, of one form the apparatus may take; and Fig. 2 is a top plan view of the same.

In the embodiment of the invention illustrated in the drawings, 10 designates generally a fruit brushing or polishing device or machine of any suitable character, the particular device or mechanism here shown being what is known in the fruit-packing industry as the Stebler-Parker type. At 11 is indicated generally a fruit drier of a type commonly preceding the polisher in the series of machines constituting a usual type of packing house installation.

According to the practice heretofore prevailing where a coating material was not to be applied to the fruit, oranges or other citrus fruit previously washed in water, and then dried, in a drier such as indicated at 11, passed without further treatment directly to a polisher, such as indicated at 10, from which they were discharged to the usual grading and sizing machinery. At 12 is indicated the usual type of endless conveyor for feeding the fruit through and from the drier toward the polisher, and at 13 the usual form of sloping board or chute to complete the forward impelling or feeding movement of the fruit to the polisher, the two elements mentioned together constituting the usual fruit feeding means.

In the illustrated apparatus here chosen to make clear the principles of the invention, means are provided for applying a coating and preservative material to the fruit so that the brushes or rolls of the polisher can act to spread this coating material over the fruit in a very thin smooth coating as the fruit travels down the runways between the rolls. In the present instance of use to which the novel apparatus is put, the coating material applied may be, for example, a suitable mixture of paraffin and gasolene in fluid or semi-fluid form.

In employing the novel apparatus for coating fruit, the coating material may be initially applied to the fruit during its forward feeding movement, from the drier to the polisher, for example.

The specific means for applying the coating material adopted in the illustrative embodiment of the invention is placed between the two elements heretofore referred to as constituting the customary means for feeding the fruit from the drier to the polisher that is between the endless conveyor 12 and the chute board 13. A box 14 of galvanized iron or other suitable material, desirably of rectangular contour, is suitably supported, as shown in Fig. 1 upon cross pieces 15 designed to extend between the side frames of the machine. The box 14 is designed to contain the immediately available supply of the fluent coating material which is supplied thereto through a conduit 16 from a main supply tank 17 by means of any suitable forcing means either hand or power operated and capable of regulation to vary at will the quantity of the material supplied, a hand operated pump 18 being here shown by way of example.

The box or container 14 is provided with an apertured or foraminous cover of flexible or yielding material, such for example as a metallic or textile fabric screen, a wire screen being indicated at 19 in the illustrative form of the apparatus, extending across the otherwise open top of the box and secured along its four top edges. Most desirably the box is arranged and supported in position to dispose its cover at a slight inclination from the horizontal in the longitudinal line of the machine with which it is associated, downwardly in the direction of the polisher and upwardly in the direction of the drier, and with its lower end substantially level with the closely adjacent end of the chute board 13, and its upper end closely adjacent the foremost extension of the path of the endless conveyor 12 but disposed a sufficient distance below the lowermost position in the path of the conveyor in which the fruit is supported thereon to intercept a gravity movement or fall of the fruit, all as shown in Fig. 1.

It will be apparent from the arrangement and operation of the parts referred to, that an article of fruit, indicated at F' in Fig. 1, such for example as an orange or grapefruit, will be advanced by the conveyor 12 out of the drier until it attains the position F² where it can no longer be supported by the conveyor, and from which position it falls in a downward and slightly forward movement upon foraminous cover 19, clearing the rearmost edge thereof which is immovably secured upon the corresponding upper edge of the box. The fruit thus deposited upon the cover is impelled forwardly in a rolling movement thereacross and to the chute board 13, by the momentum of the previous movement and, in the present instance, by the inclination of the cover, the chute board completing the forward feeding movement of the fruit to the brush rolls of the polisher.

The foraminous cover or runway 19 over the box 14 containing the immediately available supply of the coating material may be secured at its side edges under sufficient tension to extend across the box without any appreciable flexure or yielding under the impact of the fruit falling upon it or under the weight of the fruit rolling thereacross, and the hand operating pump 18 may be employed to feed the fluent material into the box and through this foraminous cover to its upper surface, where application of the coating material to the fruit occurs through the rolling movement of the fruit thereacross. The quantity of the coating material delivered to the upper surface of the foraminous cover, and hence the quantity applied to the fruit rolling thereacross, may be controllably regulated by varying the operation of the pump.

Desirably, however, and as in the present illustrative form of the apparatus, the foraminous cover 19, is secured at its side edges under sufficient tension to extend, when unencumbered, without substantial flexure or sagging across the container of the coating material, but in such manner as to flex or yield downwardly somewhat under the impact of the fruit falling thereon and under the weight of the fruit previously deposited thereon and still in course of progress thereover. The upper surface or liquid level of the semi-fluid or pasty composition is maintained in the box 14 at the desired height or varied by operation of the pump 18. The practice as to the liquid level will vary with the size and weight of the fruit to be treated, and in some instances, it may be desirable to maintain the liquid level at such a height that in the unflexed condition of the screen a portion of its surface is covered by the coating material, in other instances it may be desirable to maintain the liquid level substantially at the upper surface of the screen at its lower end, while in still other instances it may be desirable to maintain the liquid level an appreciable distance below the lowest surface of the screen in its unflexed condition.

It will be apparent that if the upper surface or liquid level of the fluent coating material in the box 14 is below the screen in its unflexed condition but above the level attained by any part of the foraminous cover in its downwardly flexing movement under the momentum of the fruit in its fall thereon or under the weight of the fruit after the impact, the cover will penetrate the mass of the composition forcing portions through its apertures into immediate contact with the fruit or into the path of the advancing fruit. It is also apparent that with the fluent material maintained at a sufficiently high level to overflow the upper surface of the foraminous cover in its unflexed condition, a flexure of the same will increase the quantity of the material delivered thereon. It is further to be noted that the quantities of the fluent coating material displaced from the available supply in the box 14 and positioned upon the upper surface of the foraminous cover in the path of the fruit vary in proportion to the extent of flexure of the cover, and that the extent of flexure of the cover in turn varies directly with the number and masses of the pieces of fruit falling thereon and rolling thereover. The flexible foraminous cover therefore functions to automatically vary the quantity of coating material supplied to the fruit in accordance with the quantity of the fruit fed thereto.

It is apparent from the foregoing that in the novel apparatus, means are provided for a double regulation of the amount of the coating material applied to the fruit, one at will by a variation of the level of the available supply and the other an automatic regulation by the coaction of the passing fruit with the flexible foraminous cover of the container of the available supply and which cover constitutes the composition applying element.

In the case of the polisher here illustrated, the brush rolls, indicated at 20, are of horsehair bristles spirally grooved and arranged in parallel in a series inclined longitudinally from their receiving ends, shown at the left as viewed in Fig. 1, downwardly to their delivery ends, and so juxtaposed as to provide elongated runways between each two adjacent rolls, along which the fruit is fed in contact with opposite brush surfaces during the brushing operation. The gears for driving the brush rolls, indicated at 21, are arranged to drive them all in the same direction, indicated generally by the arrow in Fig. 2, and the spiral cut of the brushes and their inclination are such as to feed the fruit along the runways referred to.

To aid in turning the pieces of fruit over and over in all directions as they traverse the brush runways and thus assist in obtaining thorough and uniform distribution of the coating material thereover, means may advantageously be provided arranged to yieldingly engage the upper surfaces of the pieces of fruit frictionally as they travel along the brush rolls. In the illustrative embodiment of the apparatus such means is provided in the form of a blanket 22 of any suitable material, such for example as a woven fabric, which is secured along the side edges 23 of the frame of the polisher to extend over the brush rolls.

A mixture of approximately 25 parts of paraffin and 75 parts of gasolene, by volume, has been found to give a composition of a desirable consistency for the treatment of citrus fruits here referred to as a specific example of a use for which the apparatus of my invention is adapted, altho even for the specific use here referred to such proportions of the ingredients of the composition can be varied; and so far as the operation of my apparatus is concerned they may be varied within any limits providing a composition of a sufficient degree of fluidity to be properly handled by the apparatus in the manner stated.

What I claim is:

1. Fruit treating apparatus comprising the combination, with fruit brushing means, and means for feeding fruit thereto, of means comprising a movable element adapted to be actuated by the fruit in its feeding movement for rendering coating material available in the path of said feeding movement.

2. Fruit treating apparatus comprising the combination, with fruit brushing means, and means for feeding fruit thereto, of means comprising a movable applying element adapted to be actuated by the fruit in its feeding movement for applying a coating material to the fruit.

3. Fruit treating apparatus comprising the combination with fruit brushing means, and means for feeding fruit thereto, of means for holding a supply of a coating material, means comprising a movable applying element adapted to be set in actuation by the fruit in its feeding movement for transferring portions of said material from said supply to said fruit in its feeding movement, and means for varying said supply whereby the quantity applied to said fruit is varied.

4. Fruit treating apparatus comprising the combination, with fruit brushing means, of means for feeding fruit thereto including means for imparting a gravity movement to said fruit, means comprising a variably movable element adapted to be moved to varying degrees by the momentum of said fruit in its gravity movement for applying a coating of material to the fruit in varying quantities corresponding with the masses of the individuals of said fruit.

5. Fruit treating apparatus comprising the combination, with fruit brushing means and means for feeding fruit thereto including means for imparting a gravity movement to said fruit, of means for holding a supply of a coating material, means for delivering varying quantities of said material from said supply into the path of feeding movement of said fruit, said means comprising a displacement element variably movable into said supply and adapted to be actuated in such movements to varying degrees by the momentum of said fruit in its gravity movement, and means for varying the level of said supply relative to the limits of movement of said displacement element.

6. Coating apparatus for fruit or the like, comprising in combination, means maintaining a body of fluent coating material, a foraminous element mounted and adapted to permit rolling movement of the fruit thereacross and to variably yield under the varying weight of the passing fruit, said foraminous element being also mounted relative to said body of fluent coating material adapting said element in its yielding movements to variably penetrate said body of fluent material, means to project fruit in a rolling movement across said element, and means adapted to receive fruit thus projected and to distribute adhering coating material thereover.

7. Coating apparatus for fruit or the like, comprising in combination, a container for a fluent coating material provided with a foraminous cover, means for supplying said container with said coating material, means for projecting fruit across said foraminous cover, and means adapted to receive fruit thus projected and to distribute adhering coating material thereover.

8. Fruit treating apparatus comprising the combination, with fruit brushing means, of means for feeding fruit thereto providing a gravity drop of said fruit in the course of its feeding movement, means for supplying a fluent coating material to the fruit comprising a container for said material provided with a flexible foraminous cover disposed in the line of travel of said fruit to receive said fruit from its gravity drop and to permit said fruit to roll thereacross.

9. Fruit treating apparatus comprising the combination, with fruit brushing means, of means for feeding fruit thereto providing a gravity drop of said fruit in the course of its feeding movement, means for supplying a fluent coating material to the fruit comprising a container for said material provided with a flexible foraminous cover disposed in the line of travel of said fruit to receive said fruit from its gravity drop and to permit said fruit to roll thereacross, and means for supplying said material to said container and for varying its liquid level relative to said foraminous cover.

10. Fruit treating apparatus comprising a container for coating material, a foraminous member therein depressible by passage of fruit thereover to effect application of such coating material to the fruit, in combination with means for feeding fruit to and across said depressible foraminous member.

11. Fruit treating apparatus comprising a container for coating material, a foraminous member therein depressible by passage of fruit thereover to effect application of such coating material fruit, in combination with means for feeding fruit to and across said depressible foraminous member, and rubbing means arranged to receive fruit that has been fed across said foraminous member.

12. Fruit treating apparatus comprising the combination, with rotary brush means, of a depressible composition-applying member associated therewith, adapted and arranged automatically to apply coating material to fruit gravitally deposited thereon.

13. Fruit treating apparatus comprising the combination, with rotary brush means, of a foraminous depressible member, movably actuated by the fruit in its gravity movement adjacent said brush means and cooperating therewith to apply coating material to fruit.

14. Fruit treating apparatus comprising, in combination, a drier, a rotary brushing device, and a depressible composition-applying member, adapted and arranged to render available, by actuation of the gravity drop of the fruit, a regulated supply of fluent coating material.

In testimony whereof I hereunto affix my signature.

ARCHIE W. CONKLIN.